(12) United States Patent
Ucar et al.

(10) Patent No.: US 12,183,203 B2
(45) Date of Patent: Dec. 31, 2024

(54) KNOWLEDGE TRANSFER FOR EARLY UNSAFE DRIVING BEHAVIOR RECOGNITION

(71) Applicant: TOYOTA MOTOR ENGINEERING & MANUFACTURING NORTH AMERICA, INC., Plano, TX (US)

(72) Inventors: Seyhan Ucar, Mountain View, CA (US); Takamasa Higuchi, Mountain View, CA (US); Kentaro Oguchi, Mountain View, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 290 days.

(21) Appl. No.: 17/578,677

(22) Filed: Jan. 19, 2022

(65) Prior Publication Data
US 2023/0230421 A1 Jul. 20, 2023

(51) Int. Cl.
G08G 1/16 (2006.01)
B60W 40/09 (2012.01)
H04W 4/46 (2018.01)

(52) U.S. Cl.
CPC ............ *G08G 1/162* (2013.01); *B60W 40/09* (2013.01); *H04W 4/46* (2018.02)

(58) Field of Classification Search
CPC ........ G08G 1/161; G08G 1/162; G08G 1/163; G08G 1/164; G08G 1/22; G05D 1/0214; G05D 1/0027; G05D 1/0287; G05D 1/0289; B60W 2050/048; B60W 2556/65; B60W 40/09; B60W 30/0953; H04W 4/46; B60K 2360/5915
See application file for complete search history.

(56) References Cited

U.S. PATENT DOCUMENTS

2010/0256836 A1 10/2010 Mudalige
2016/0332624 A1* 11/2016 Tezuka .................. B60W 30/16
(Continued)

FOREIGN PATENT DOCUMENTS

| CN | 110020797 | 7/2019 |
|----|-----------|--------|
| WO | 2020203352 | 10/2020 |

OTHER PUBLICATIONS

Laine et al., "Eyes-Closed Safety Kernels: Safety of Autonomous Systems Under Loss of Observability," Robotics: Science and Systems 2020, Jul. 16, 2020, 9 pages (https://roboticsconference.org/2020/program/papers/96.html).

(Continued)

*Primary Examiner* — Khoi H Tran
*Assistant Examiner* — Tanner L Cullen
(74) *Attorney, Agent, or Firm* — SHEPPARD, MULLIN, RICHTER & HAMPTON LLP; Daniel N. Yannuzzi

(57) ABSTRACT

Systems and methods of unsafe driving detection are provided which share partial unsafe driving behavior analyses with others in order to ensure that unsafe driving behavior is detected as early as possible. For example, in response to an event which interrupts a first detecting vehicle from collecting additional driving behavior data associated with a subject vehicle, the first detecting vehicle may transfer driving behavior data it has already collected and processed, to another detecting entity (e.g., a second detecting vehicle) in observable range of the subject vehicle.

20 Claims, 8 Drawing Sheets

(56) References Cited

U.S. PATENT DOCUMENTS

| | | |
|---|---|---|
| 2018/0096600 A1 | 4/2018 | Bletzer |
| 2020/0008028 A1* | 1/2020 | Yang .................... G08G 1/0175 |
| 2020/0043342 A1* | 2/2020 | Cunningham ... G08G 1/096791 |
| 2020/0137580 A1* | 4/2020 | Yang .................... H04W 12/122 |
| 2020/0139974 A1* | 5/2020 | Schreiber .......... B60W 30/0956 |
| 2021/0049908 A1* | 2/2021 | Pipe .................... G08G 1/0112 |
| 2022/0101726 A1* | 3/2022 | Fields .............. G08G 1/096741 |
| 2022/0297688 A1* | 9/2022 | Park ...................... G01S 15/931 |
| 2022/0363267 A1* | 11/2022 | Kristinsson ........... B60W 40/09 |

OTHER PUBLICATIONS

Palanisamy, "Multi-Agent Connected Autonomous Driving using Deep Reinforcement Learning," 2020 International Joint Conference on Neural Networks (IJCNN), Nov. 11, 2019, 16 pages (https://arxiv.org/abs/1911.04175).

* cited by examiner

KNOWLEDGE TRANSFER FOR EARLY UNSAFE DRIVING BEHAVIOR RECOGNITION

TECHNICAL FIELD

The present disclosure relates generally to automotive systems and technologies, and more particularly, some examples relate to knowledge transfer between unsafe driving behavior recognition systems.

DESCRIPTION OF RELATED ART

Unsafe driving behavior may refer to driving behavior which jeopardizes the safety of others. Examples of unsafe driving behavior include aggressive driving (e.g., tailgating, aggressive merging/nudging, etc.), distracted driving (e.g., swerving, delayed reactions, etc.), and reckless driving (e.g., red light running, changing lanes without signaling, etc.).

Unsafe driving is a major problem. According to reports on road safety, more than half of fatal crashes originate from aggressive drivers, and 87% of rear-end collisions (the most frequent type of collision in the US) result from distracted driving behavior.

BRIEF SUMMARY OF THE DISCLOSURE

According to various examples of the disclosed technology, a method of unsafe driving detection is provided. The method, in accordance with examples of the technology disclosed herein comprises: (1) collecting, by an electronic control unit (ECU) in a first detecting vehicle, driving behavior data associated with a subject vehicle; (2) processing, by the ECU, the collected driving behavior data to determine whether the subject vehicle is driving unsafely; and (3) in response to an event which interrupts the ECU from collecting additional driving behavior data associated with the subject vehicle, transferring, by the ECU, the processed driving behavior data to a second detecting vehicle. In some examples, the event which interrupts the ECU from collecting additional driving behavior data associated with the subject vehicle may comprise a change in positional relationship between the first detecting vehicle and the subject vehicle. In certain examples, processing the collected driving behavior data to determine whether the subject vehicle is driving unsafely may comprise: (a) detecting, by the ECU, unsafe driving behavior by the subject vehicle based on the collected driving behavior data; and (b) determining, by the ECU, that the detected unsafe driving behavior does not satisfy a threshold factor for unsafe driving behavior that indicates the subject vehicle is driving unsafely.

In various examples, another method for unsafe driving detection is provided. The method, in accordance with examples of the technology disclosed herein comprises: (1) collecting, by an ECU in a first detecting vehicle, driving behavior data associated with a subject vehicle; (2) transferring, by the ECU, the collected driving behavior data to a second detecting entity; and (3) receiving, by the ECU, from the second detecting entity, a notification that the subject vehicle is driving unsafely.

In some examples, a vehicle system is provided. The vehicle system, in accordance with examples of the technology disclosed herein comprises: an ECU including machine executable instructions in non-transitory memory to: (a) receive, from a detecting vehicle, a first driving behavior data associated with a subject vehicle; (b) collect, from the vehicle system, a second driving behavior data associated with the subject vehicle; and (c) based on the first and second driving behavior data, determine that the subject vehicle is driving unsafely.

Other features and aspects of the disclosed technology will become apparent from the following detailed description, taken in conjunction with the accompanying drawings, which illustrate, by way of example, the features in accordance with examples of the disclosed technology. The summary is not intended to limit the scope of any inventions described herein, which are defined solely by the claims attached hereto.

BRIEF DESCRIPTION OF THE DRAWINGS

The present disclosure, in accordance with one or more various examples, is described in detail with reference to the following figures. The figures are provided for purposes of illustration only and merely depict typical or example examples.

Figure 1:
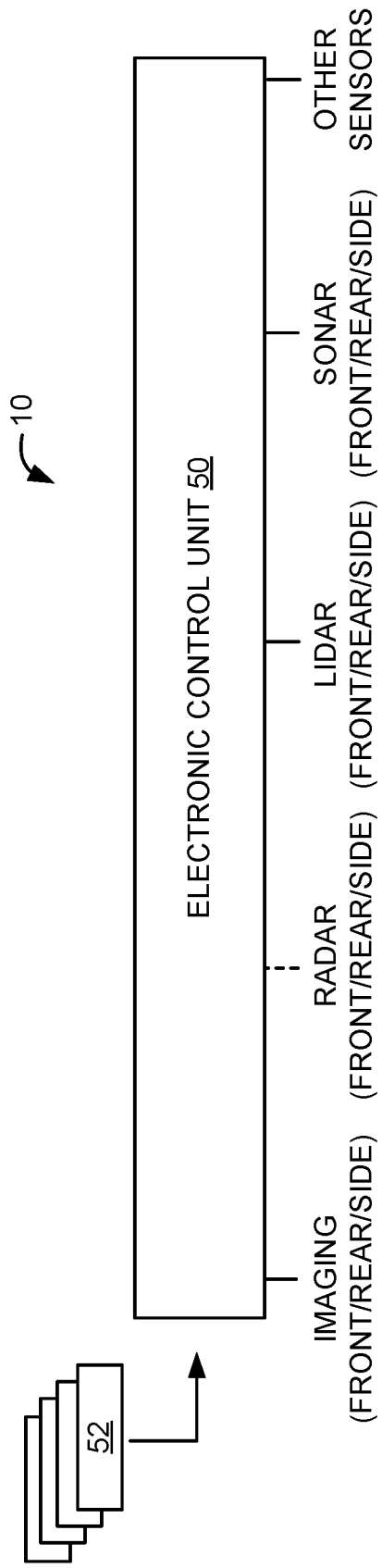
FIG. 1 is a schematic representation of an example vehicle having an electronic control unit and sensors.

The figures are not exhaustive and do not limit the present disclosure to the precise form disclosed.

DETAILED DESCRIPTION

As described above, unsafe driving behavior (i.e., driving behavior which jeopardizes the safety of others) is a major problem. Accordingly, unsafe driving detection technologies have been developed to detect unsafe driving behavior and provide warnings to nearby drivers.

Unsafe driving detection technologies can involve a "detecting vehicle" collecting driving behavior data (as used herein, driving behavior data may refer to movement data and traffic-related characteristics of a vehicle) associated with a subject vehicle, and processing the collected driving behavior data to determine whether the subject vehicle is driving unsafely. In many examples, the driving behavior data is collected by image and proximity sensors of the detecting vehicle (e.g., cameras, radar, lidar, sonar, etc.).

A problem with existing unsafe driving detection technologies is that certain events (e.g., a change in positional relationship between a detecting vehicle and the subject vehicle, partial occlusion of a detecting vehicle's sensors, noise in a detecting vehicle's sensor system, etc.) may interrupt a detecting vehicle's unsafe driving detection analysis. In many situations, such an interruption will arise before a detecting vehicle is able to determine that the subject vehicle is driving unsafely. In other words, additional data/analysis may be required to ultimately determine that the subject vehicle is driving unsafely.

Unfortunately, in these situations, existing unsafe driving detection technologies fail to leverage the partial unsafe driving analysis performed by the detecting vehicle. In particular, the driving behavior data collected and processed by the detecting vehicle remains with the detecting vehicle and is not shared with others. Thus, even if a second detecting vehicle is able to commence unsafe driving analysis for the subject vehicle, such analysis will have to start from scratch. Accordingly, detection of unsafe driving by the subject vehicle may be delayed. Such a delay can have severe consequences in unsafe driving scenarios where one high speed swerve into an unsuspecting vehicle can have catastrophic results.

Against this backdrop, examples of the presently-disclosed technology share knowledge acquired from partial unsafe driving behavior analyses with others in order to ensure that unsafe driving behavior is detected as early as possible. For example, in response to an event which interrupts a first detecting vehicle from collecting additional driving behavior data associated with the subject vehicle, the first detecting vehicle may transfer driving behavior data it has already collected and processed, to another detecting entity in observable range of the subject vehicle (i.e., a second detecting entity). Accordingly, the second detecting entity (e.g., a second detecting vehicle), may leverage the unsafe driving detection analysis it receives, when commencing its own unsafe driving analysis for the subject vehicle. In this way, unsafe driving by the subject vehicle may be identified earlier than if the second detecting entity had to start its unsafe driving analysis from scratch. Thus, the second detecting vehicle may take remedial action (e.g., alerting other drivers or pedestrians, contacting the police, etc.) as early as possible. This early action may improve traffic safety.

In various examples, the first detecting vehicle may collect raw driving behavior data (e.g., lane offset measurements, distance to collision measurements, vehicle speeds, etc.) associated with the subject vehicle from on-vehicle imaging and proximity sensors. Accordingly, the first detecting vehicle may process this raw driving behavior data utilizing algorithms designed to detect unsafe driving behaviors (e.g., swerving, tailgating, aggressive merging/nudging) from this raw driving behavior data. For example, one algorithm may be designed to detect swerving behavior from lane offset measurements. In certain examples, the first detecting vehicle may only determine that the subject vehicle is driving unsafely if it detects a threshold factor for unsafe driving behavior which indicates that the subject vehicle is indeed driving unsafely. For example, the first detecting vehicle may need to detect three consecutive swerves by the detecting vehicle in the span of 30 seconds in order to determine that the subject vehicle is driving unsafely (here, such a determination may trigger remedial actions such as alerting other drivers on the road).

In some situations, when transferring its collected/processed driving behavior data to others, the detecting vehicle may have detected some unsafe driving behavior from the subject vehicle, but not enough to determine that the subject vehicle is driving unsafely. In other words, the first detecting vehicle may transfer a "partial" unsafe driving analysis which requires further observation/analysis to determine whether the subject vehicle is indeed driving unsafely. As described above, this "partial analysis" may serve as a starting point for a second detecting entity to essentially pick up where the first detecting vehicle left off. Accordingly, the amount of time it takes the second detecting entity to determine that the subject vehicle is driving unsafely may be reduced.

In various examples, in addition to transferring collected/processed driving behavior data to other detecting entities, the first detecting vehicle may also transfer a pseudo identification for the subject vehicle. A pseudo identification may refer to an artificial identification for the subject vehicle. In certain examples, the pseudo identification may comprise one or more hash values corresponding to at least one of the following: (1) vehicle type; (2) vehicle color; and (3) location of the subject vehicle within a road section. A second detecting may utilize this pseudo identification to quickly identify the subject vehicle within a road section. Thus, the second detecting entity may commence its own unsafe driving analysis expediently, resulting in earlier unsafe driving detection. As described above, early unsafe driving detection may improve traffic safety.

FIG. 1 illustrates an example detecting vehicle (vehicle 10) having an electronic control unit 50 and sensors 52.

Electronic control unit 50 may include circuitry to control various aspects of vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an unsafe driving detection module, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors 52 included in vehicle 10. Sensors 52 may be included to detect conditions external to vehicle 10. For example, sensors 52 may include imaging sensors (such as cameras), and proximity sensors (such as radar, lidar, and sonar) which may be used to detect the movement and location of vehicles and pedestrians in the proximity of vehicle 10.

In particular, sensors 52 may be used to detect movement and traffic-related characteristics associated with a subject vehicle. For example, sensors 52 may detect the speed, acceleration, heading, and location of the subject vehicle. Sensors 52 may also detect lane offset measurements for the subject vehicle (e.g., the amount that the subject vehicle deviates from the center-line of a lane), the operation (or non-operation) of lights and turn signals on the subject vehicle, and the subject vehicle's movement and location relative to other vehicles (e.g. distance to collision measurements between the subject vehicle and a vehicle). In certain examples, sensors 52 may detect traffic-related characteristics which can be used to identify a subject vehicle (e.g., vehicle type, vehicle color, etc.). As will be described below, data collected from sensors 52 may be used to (1) detect unsafe driving behavior by the subject vehicle; and (2) construct a pseudo identification for the subject vehicle which can help other detecting entities identify the subject vehicle prior to commencing their own unsafe driving analyses.

Sensors 52 may also be used to detect movement and traffic-related characteristics associated with other potential detecting entities (e.g., other detecting vehicles). For example, sensors 52 may detect the movement and location of other potential detecting vehicles relative to the subject vehicle. As will be described below, this information may be used to determine whether a potential detecting entity is within an observable range of the subject vehicle. Accordingly, a detecting vehicle transferring unsafe driving behavior knowledge to others may only transfer such knowledge to detecting entities within observable range of the subject vehicle.

One or more of the sensors 52 may include their own processing capability to compute the results for additional information that can be provided to electronic control unit 50. In other examples, one or more sensors may be data-gathering-only sensors that provide only raw data to electronic control unit 50. In further examples, hybrid sensors may be included that provide a combination of raw data and processed data to electronic control unit 50. Sensors 52 may provide an analog output or a digital output.

Figure 2:
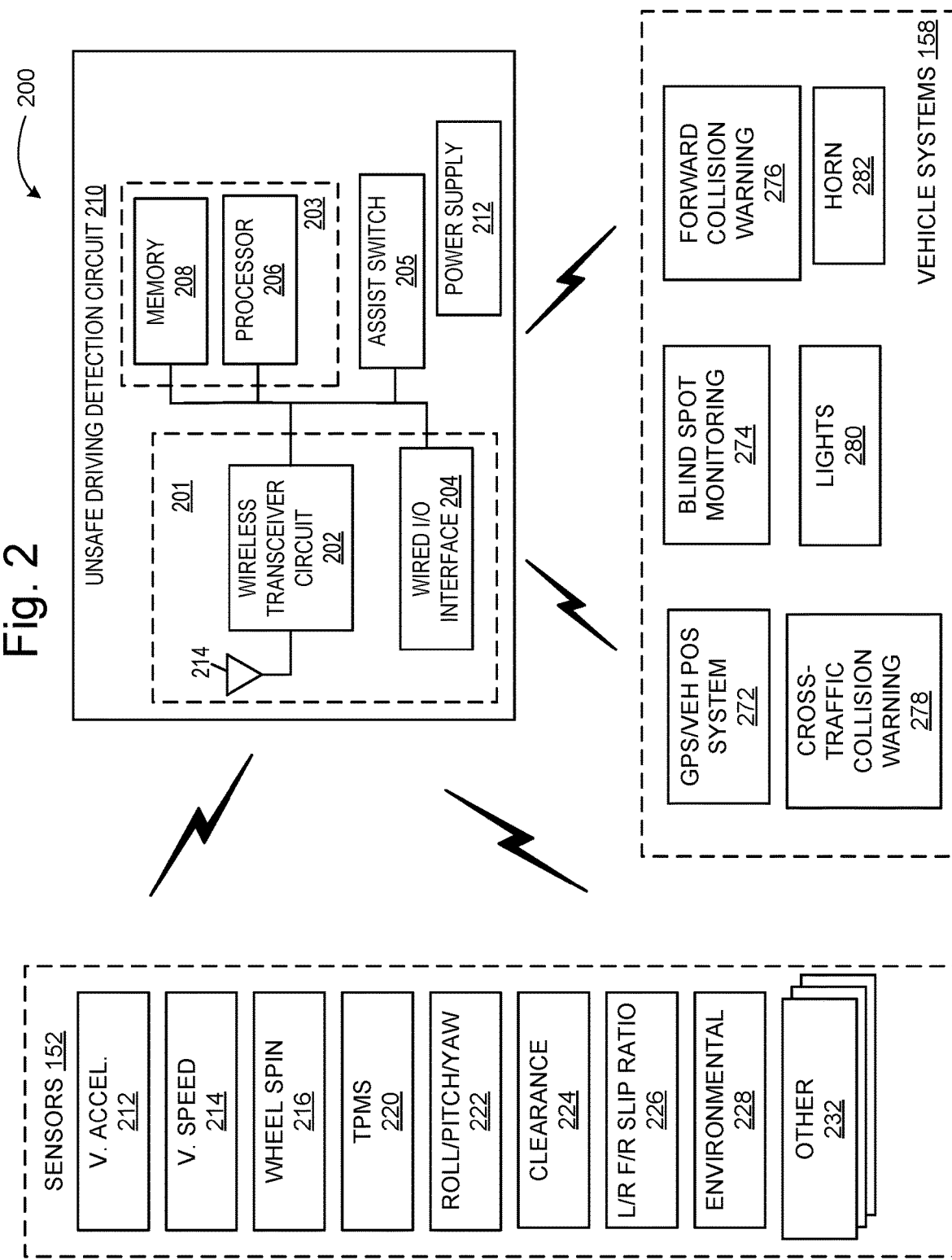
FIG. 2 illustrates an example architecture for collaborative unsafe driving detection, in accordance with one example of the systems and methods.

FIG. 2 illustrates an example architecture for (1) transferring unsafe driving analysis to another detecting entity, and (2) leveraging another detecting vehicle's unsafe driving analysis to determine that a subject vehicle is driving unsafely. Referring now to FIG. 2, in this example, unsafe driving detection system 200 includes an unsafe driving detection circuit 210, a plurality of sensors 152, and a plurality of vehicle systems 158. Sensors 152 and vehicle systems 158 can communicate with unsafe driving detection circuit 210 via a wired or wireless communication interface. Although sensors 152 and vehicle systems 158 are depicted as communicating with unsafe driving detection circuit 210, they can also communicate with each other as well as with other vehicle systems. Unsafe driving detection circuit 210 can be implemented as an ECU or as part of an ECU such as, for example electronic control unit 50. In other examples, unsafe driving detection circuit 210 can be implemented independently of an ECU.

Unsafe driving detection circuit 210 in this example includes a communication circuit 201, a decision circuit (including a processor 206 and memory 208 in this example) and a power supply 212. Components of unsafe driving detection circuit 210 are illustrated as communicating with each other via a data bus, although other communication in interfaces can be included. Unsafe driving detection circuit 210 in this example also includes a manual assist switch 205 that can be operated by the user to manually select the unsafe driving detection mode.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to unsafe driving detection circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up unsafe driving detection circuit 210.

Communication circuit 201 may include either or both of a wireless transceiver circuit 202 with an associated antenna 214 and a wired I/O interface 204 with an associated hardwired data port (not illustrated). As this example illustrates, communications with unsafe driving detection circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by unsafe driving detection circuit 210. For example, the RF signals can include driving behavior data associated with a subject vehicle collected/processed by a first detecting vehicle.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

As will be described in greater detail below, in some examples unsafe driving detection circuit 210 may use V2X communication to communicate with other vehicles (V2V communications) or roadside units of a vehicle-to-infrastructure (V2I) communications system (i.e., pieces of smart infrastructure). These communications can be received directly by unsafe driving detection circuit 210, another electronic control unit, or other communications component of vehicle 10 (and forwarded to unsafe driving detection circuit 210 via communication circuit 201).

Power supply 212 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can also include additional sensors that may or not otherwise be included on a standard vehicle 10 with which the turn unsafe driving detection system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions).

Additional sensors 232 can also be included as may be appropriate for a given implementation of unsafe driving detection system 200. For example, additional sensors 232 may include imaging sensors (such as cameras), and proximity sensors (such as radar, lidar, and sonar) which may be used to detect the movement and location of objects, such as vehicles and pedestrians. For example, these sensors may be used to detect movement and traffic-related characteristics associated with a subject vehicle. Accordingly, driving behavior data collected from these sensors may be used to detect unsafe driving behaviors (e.g., swerving, tailgating, etc.) and determine whether a subject vehicle is driving unsafely.

Vehicle systems 158 can include any of a number of different vehicle components or subsystems used to control or monitor various aspects of the vehicle and its performance. In this example, the vehicle systems 158 include a GPS or other vehicle positioning system 272 for detecting the location of vehicle 10 (including in relation to other vehicles and/or objects); Blind Spot Monitoring system 274 for detecting the movement and location of objects behind vehicle 10; Forward Collision Warning system 276 for detecting the movement and location of objects in front of vehicle 10; Cross-Traffic Collision Warning system 278 for detecting the movement and location of objects to the sides of vehicle 10; and light system 280 and horn 282, which may be used to signal vehicles and pedestrians to unsafe driving behavior.

Figure 3:
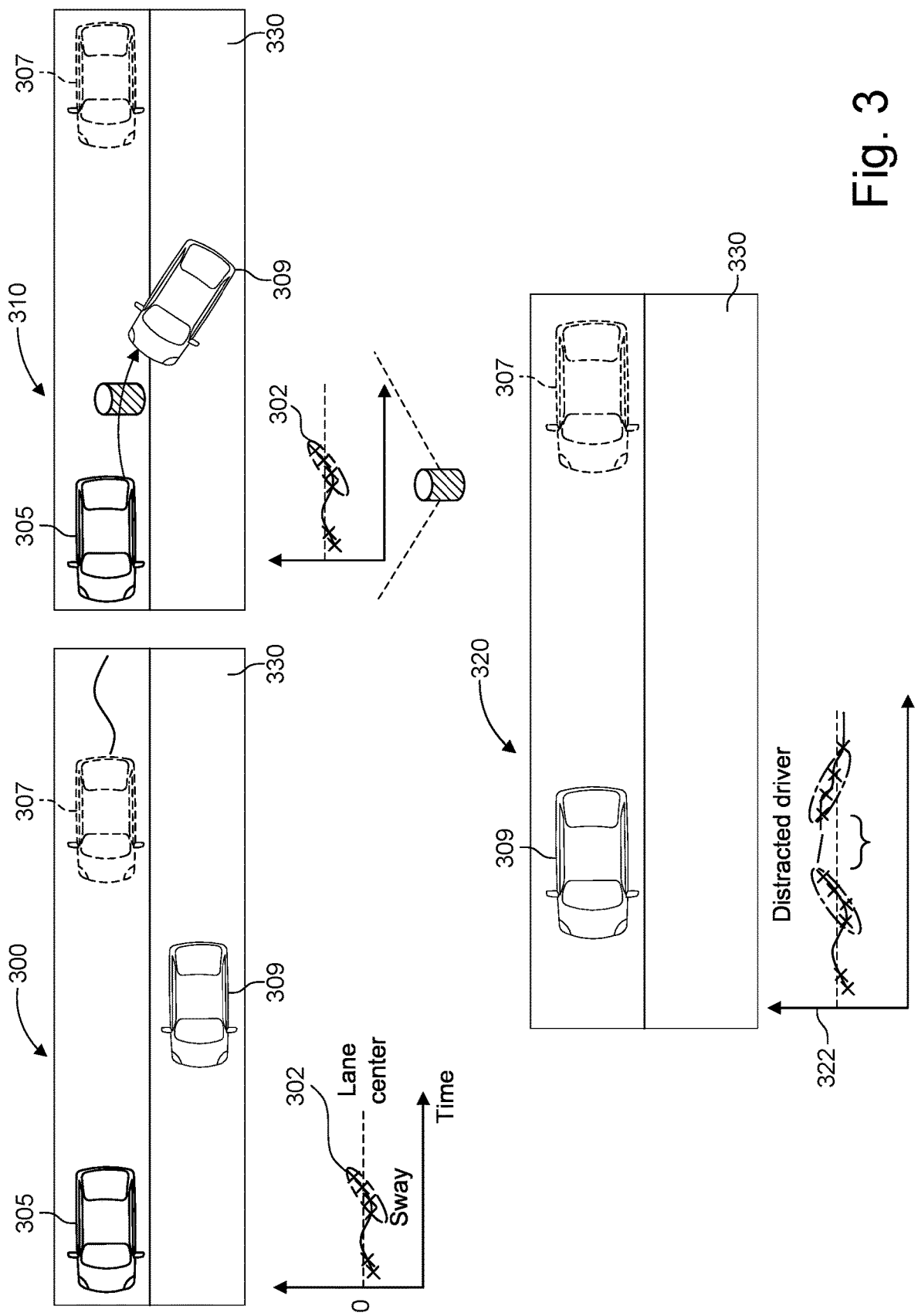
FIG. 3 depicts an example distracted driving scenario in which examples of the disclosed technology may be implemented.

FIG. 3 depicts an example distracted driving scenario in which examples of the disclosed technology may be implemented. Diagram 300 depicts traffic on roadway section 330 at a first time. Diagram 310 depicts traffic on roadway section 330 at a second time (after the first time), and diagram 320 depicts traffic on roadway section 330 at a third time (after the second time).

As depicted by diagram 300, at the first time, detecting vehicle 305 is driving in front of subject vehicle 307 in the right lane of roadway section 330. Vehicle 309 is in the left lane of roadway section 330.

At the first time, detecting vehicle 305 is performing unsafe driving analysis on subject vehicle 307. As described above, this may involve (1) collecting driving behavior data associated with subject vehicle 307; and (2) processing the collected driving behavior data to determine whether subject vehicle 307 is driving unsafely.

As described above, unsafe driving behavior may refer to driving behavior which jeopardizes the safety of others. Examples of unsafe driving behavior include aggressive driving (e.g., tailgating, aggressive merging/nudging, etc.), distracted driving (e.g., swerving, delayed reactions, etc.), and reckless driving (e.g., red light running, changing lanes without signaling, etc.).

Driving behavior data may refer to movement data and traffic-related characteristics associated with a vehicle. For example, driving behavior data may comprise the speed, acceleration, heading, and location of, e.g., a subject vehicle. Driving behavior data may also comprise lane offset measurements for the subject vehicle (e.g., the amount that the subject vehicle deviates from the center-line of a lane), the operation (or non-operation) of lights and turn signals on the subject vehicle, and the subject vehicle's movement and location relative to other vehicles (e.g. distance to collision measurements between the subject vehicle and a vehicle). In certain examples, driving behavior data may also comprise traffic-related characteristics which can be used to identify subject vehicle 307 (e.g., vehicle type, vehicle color, etc.). In the illustrative example of FIG. 3, detecting vehicle 305 is collecting lane offset measurements for subject vehicle 307. As will be described below, lane offset measurements may be used to detect whether a vehicle is swerving. Consecutive swerving can indicate that a vehicle is driving unsafely (e.g., the driver of the vehicle may be drunk or distracted).

Detecting vehicle 305 may collect driving behavior data associated with subject vehicle 307 using on-vehicle image and proximity sensors (e.g., cameras, radar, lidar, sonar, etc.). For example, detecting vehicle 305 may use a rear facing camera to collect lane offset measurements for subject vehicle 307. As depicted in diagram 300, at the first time, detecting vehicle 305 has an unobstructed view of subject vehicle 307. Subject vehicle 307 is also within observable range of detecting vehicle 305 (i.e., the range of distances between detecting vehicle 305 and subject vehicle 307 where detecting vehicle 305 can collect reliable driving behavior data). Accordingly, the image and proximity sensors of detecting vehicle 305 may collect driving behavior data associated with subject vehicle 307 uninterrupted. However, as will be described in conjunction with diagram 310, detecting vehicle 305's positional relationship with subject vehicle 307 may change so that further collection of driving behavior data associated with subject vehicle 307 becomes interrupted.

Detecting vehicle 305 may process the driving behavior data it collects to determine whether subject vehicle 307 is driving unsafely in any number of ways. For example, detecting vehicle 305 may utilize algorithms which detect unsafe driving behaviors (e.g., tailgating, swerving, nudging, etc.) from raw driving behavior data. In the example of FIG. 3, detecting vehicle 305 may utilize an algorithm which detects swerving behavior based on collected lane offset measurements. For illustration, graph 302 depicts detected swerving behavior of subject vehicle 307 based on lane offset measurements.

In certain examples, detecting vehicle 305 may only determine that subject vehicle 307 is driving unsafely if the detected amount of swerving satisfies a threshold swerving factor. In other words, a single swerve may not be sufficient to determine that subject vehicle 307 is driving unsafely. For example, subject vehicle 307 may swerve once to avoid a piece of debris. This single swerve would not be indicative of unsafe/distracted driving. Accordingly, detecting vehicle 305 can avoid misclassifying subject vehicle 307 as driving unsafely by utilizing a threshold swerving factor which requires, e.g., two consecutive swerves, to determine that a subject vehicle is driving unsafely. In certain examples, this threshold swerving factor may be pre-determined. In other examples, detecting vehicle 305 may learn to set the threshold swerving factor by observing driving behavior over time.

As depicted by diagram 310, at the second time, vehicle 309 is beginning to merge in between detecting vehicle 305 and subject vehicle 307. In other words, the positional relationship between detecting vehicle 305 and subject vehicle 307 is about to change. In certain situations, this change in positional relationship may interrupt detecting vehicle 305 from collecting additional driving behavior data associated with subject vehicle 307. For example, if detecting vehicle 305 is using a rear facing camera to measure the lane offsets of subject vehicle 307, vehicle 309's merge may obstruct the camera's view of subject vehicle 307. Accordingly, detecting vehicle 305's unsafe driving analysis for subject vehicle 307 may be interrupted.

Examples of the presently disclosed technology respond to this interruption by transferring unsafe driving analysis, to other detecting entities (e.g., a second detecting vehicle). In certain examples, these other detecting entities may have recently entered a positional relationship with the subject vehicle which allows them to perform unsafe driving analyses on the subject vehicle. In the example of FIG. 3, once merged, vehicle 309 may enter a new positional relationship with subject vehicle 307 which allows vehicle 309 to perform unsafe driving analysis on subject vehicle 307. For example, vehicle 309 may use its own rear-facing camera to collect driving behavior data (e.g., lane offset measurements) associated with subject vehicle 307. Accordingly, vehicle 309 may process the driving behavior data it collects to determine whether subject vehicle 307 is driving unsafely.

Here, by transferring collected/processed driving behavior data to vehicle 309, detecting vehicle 305 ensures that vehicle 309 is able to determine that subject vehicle 307 is driving unsafely, as quickly as possible. In other words, by transferring its unsafe driving analysis to vehicle 309, detecting vehicle 305 ensures that vehicle 309 gets a jump start on its own unsafe driving analysis.

Referring again to diagram 310, at the second time, detecting vehicle 305 may determine that the amount of swerving it has detected so far does not satisfy a threshold swerving factor that indicates subject vehicle 307 is driving unsafely (as depicted by graph 302, at the second time, detecting vehicle 305 detected one swerve by subject vehicle 307 where the threshold amount of swerving required to determine that subject vehicle 307 is driving unsafely may be two consecutive swerves). In other words, detecting vehicle 305 may have a partial unsafe driving analysis which requires further observation/analysis to determine that subject vehicle 307 is indeed driving unsafely.

Accordingly, at the second time, detecting vehicle 305 may transfer a "partial" unsafe driving analysis to vehicle 309 which requires additional data/analysis to determine that subject vehicle 307 is driving unsafely.

Referring now to diagram 320, at the third time, vehicle 309 is performing its own unsafe driving analysis on subject vehicle 307. Like detecting vehicle 305, vehicle 309 may be using a rear facing camera to collect lane offset measurements for subject vehicle 307. Using a same/similar algorithm, vehicle 309 may detect swerving behavior exhibited by subject vehicle 307 based on collected lane offset measurements. For example, vehicle 309 may detect one swerve by subject vehicle 307. As described above, detecting one swerve may not be enough to determine that subject vehicle 307 is driving unsafely. However, if vehicle 309 combines its own unsafe driving analysis with the unsafe driving analysis it received from detecting vehicle 305, vehicle 309 may determine that subject vehicle 307 has swerved twice in a short amount of time. This finding may be sufficient for vehicle 309 to determine that subject vehicle 307 is driving unsafely. For illustration, the two detected swerves of subject vehicle 307 are depicted in graph 322.

As illustrated by the example above, based on the partial unsafe driving analysis it received from detecting vehicle 305, vehicle 309 is able to determine that subject vehicle 307 is driving unsafely after observing/detecting a single swerve. In other words, without the knowledge transfer of the presently disclosed technology, vehicle 309 would have to wait to observe/detect a second swerve before determining that subject vehicle 307 is driving unsafely. While this may not seem like much, in a districted driving scenario, a single additional swerve can be catastrophic for nearby vehicles. By facilitating early detection of unsafe driving, examples of the presently disclosed technology allow for remedial action (e.g., alerting other drivers or pedestrians, contacting the police, etc.) to be taken as quickly as possible, which can improve traffic safety.

Figure 4:
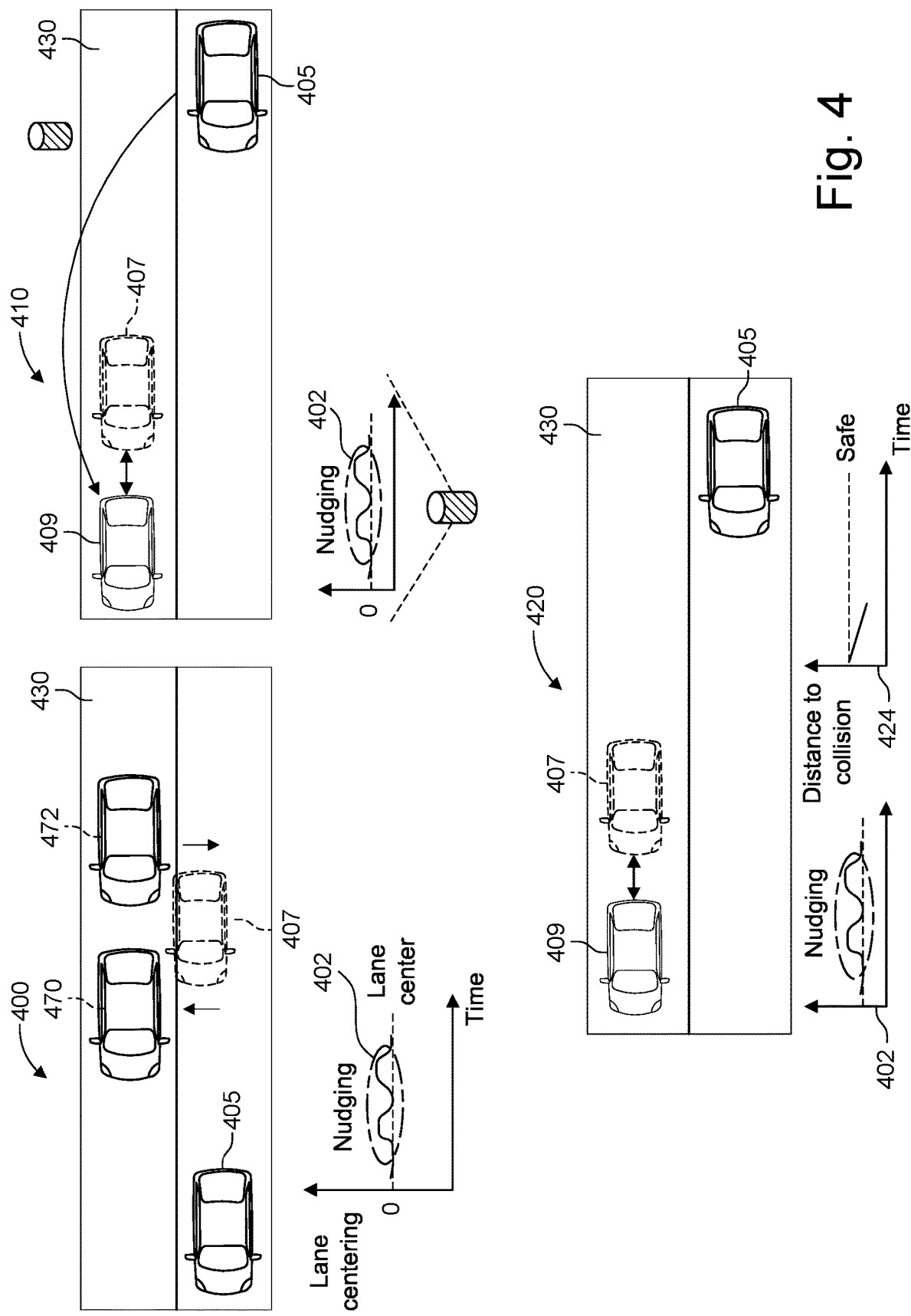
FIG. 4 depicts an example aggressive driving scenario in which examples of the disclosed technology may be implemented.

FIG. 4 depicts an example aggressive driving scenario in which examples of the disclosed technology may be implemented. Diagram 400 depicts traffic on roadway section 430 at a first time. Diagram 410 depicts traffic on roadway section 430 at a second time (after the first time), and diagram 420 depicts traffic on roadway section 430 at a third time (after the second time).

As depicted by diagram 400, at the first time, detecting vehicle 405 is driving in front of subject vehicle 407 in the left lane of roadway section 430. Vehicles 470 and 472 are driving in the right lane of roadway section 430, adjacent to subject vehicle 407. Subject vehicle 407 is trying to "nudge" its way in between vehicles 470 and 472 in an attempt to merge into the right lane. As will be described below, such nudging behavior, in combination with other aggressive driving behaviors (e.g., tailgating) may indicate that subject vehicle 407 is driving unsafely.

At the first time, detecting vehicle 405 is performing unsafe driving analysis on subject vehicle 407. As described above, this may involve (1) collecting driving behavior data associated with subject vehicle 407; and (2) processing the collected driving behavior data to determine whether subject vehicle 407 is driving unsafely.

Here, unsafe driving behavior and driving behavior data may be defined in the same/similar manner as defined in conjunction with FIG. 3. In addition, detecting vehicle 405 may collect driving behavior data in the same/similar manner as detecting vehicle 305 of FIG. 3. For example, detecting vehicle 405 may use a rear facing camera to collect lane offset measurements for subject vehicle 407.

Detecting vehicle 405 may process the driving behavior data it collects to determine whether subject vehicle 407 is driving unsafely in the same general manner described in conjunction with FIG. 3. In the specific example of FIG. 4, detecting vehicle 405 may utilize an algorithm which detects nudging behavior based on collected lane offset measurements. For illustration, graph 402 depicts detected nudging behavior of subject vehicle 407 based on lane offset measurements.

In certain examples, detecting vehicle 405 may only determine that subject vehicle 407 is driving unsafely if further aggressive driving behavior (e.g., tailgating) is detected in addition to nudging behavior. In other words, a threshold factor for unsafe driving behavior may require detection of further aggressive driving behavior in addition to nudging behavior. This may be the case because in certain situations nudging behavior is not considered to be unsafe/ aggressive (e.g., congested traffic scenarios). Accordingly, while detecting vehicle 405 has detected nudging behavior from subject vehicle 407, this nudging behavior alone may be insufficient to determine that subject vehicle 407 is indeed driving unsafely.

Referring now to diagram 410, at the second time, subject vehicle 407 has merged into the right lane, and is now ahead of detecting vehicle 405, which is still in the left lane. In other words, the positional relationship between detecting vehicle 405 and subject vehicle 407 has changed. This change in positional relationship may interrupt detecting vehicle 405 from collecting additional driving behavior data associated with subject vehicle 407. For example, subject vehicle 407 may now be outside the reliable range of detecting vehicle 405's image and proximity sensors. Accordingly, the unsafe driving analysis performed by detecting vehicle 405 may be interrupted.

As described above, examples of the presently disclosed technology respond to this interruption by transferring the unsafe driving analysis acquired by vehicle 405, to other detecting entities (e.g., a second detecting vehicle). In certain examples, the other detecting entities may have recently entered a positional relationship with the subject vehicle which allows them to perform unsafe driving analyses on the subject vehicle. In the example of diagram 410, at the second time, subject vehicle 407 is following vehicle 409 at a close distance. Accordingly, at the second time, detecting vehicle 405 may recognize that vehicle 409 is in a positional relationship with subject vehicle 407 which allows vehicle 409 to perform unsafe driving analysis for subject vehicle 407.

Here, by transferring collected/processed driving behavior data to vehicle 409, detecting vehicle 405 ensures that vehicle 409 is able to determine that subject vehicle 407 is driving unsafely, as quickly as possible. In other words, by transferring the unsafe driving analysis to vehicle 409, detecting vehicle 405 ensures that vehicle 409 gets a jump start on its own unsafe driving analysis.

Referring now to diagram 420, at the third time, vehicle 409 is performing its own unsafe driving analysis on subject vehicle 407. Here instead of collecting lane offset measurements, vehicle 409 is collecting distance to collision measurements (i.e., the distance between vehicle 409 and subject vehicle 407) and vehicle speed measurements. Accordingly, utilizing an algorithm which detects tailgating behavior based on distance to collision and vehicle speed measurements, vehicle 409 may detect tailgating behavior exhibited by subject vehicle 407 (as used herein, tailgating behavior may refer to driving behavior where a trailing vehicle does not provide sufficient distance to stop without causing a collision if the vehicle in front of it stops suddenly).

Similar to nudging behavior, detected tailgating behavior on its own may not be enough to determine that subject vehicle 407 is driving unsafely. However, as described above, tailgating behavior in addition to detected nudging behavior may be sufficient for vehicle 409 to determine that subject vehicle 407 is driving unsafely. Accordingly, because of the partial unsafe driving analysis it received from detecting vehicle 405, vehicle 409 may determine that subject vehicle 407 is driving unsafely after merely detecting tailgating behavior. In other words, without the knowledge transfer of presented examples, vehicle 409 would have to wait to observe/detect additional aggressive driving behavior (e.g., an aggressive lane change/nudging behavior) before determining that subject vehicle 407 was driving unsafely. Accordingly, by facilitating early detection of unsafe driving/unsafe drivers, examples of the presently disclosed technology may improve traffic safety.

Figure 5:
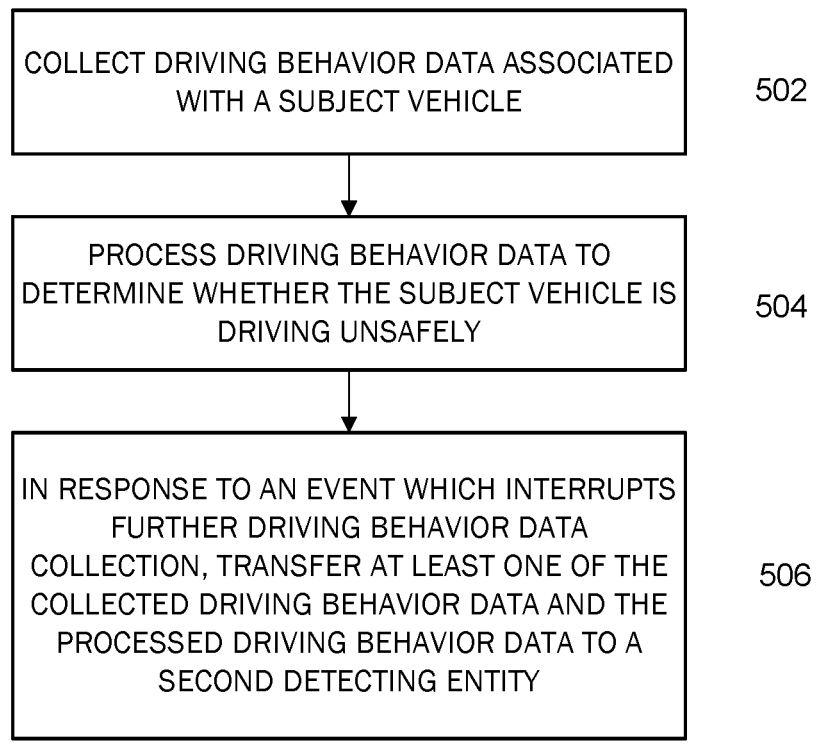
FIG. 5 is a flowchart illustrating example operations that can be performed by an electronic control unit (ECU) in a detecting vehicle to transfer unsafe driving analysis to another detecting entity.

FIG. 5 is a flowchart illustrating example operations that can be performed by an electronic control unit (ECU) in a detecting vehicle to transfer unsafe driving analysis to a second detecting entity.

At operation 502, the ECU may collect driving behavior data associated with a subject vehicle.

As described above, driving behavior data may refer to movement data and traffic-related characteristics associated with a subject vehicle. For example, driving behavior data may comprise the speed, acceleration, heading, and location of the subject vehicle. Driving behavior data may also comprise lane offset measurements for the subject vehicle (e.g., the amount that the subject vehicle deviates from the center-line of a lane), the operation (or non-operation) of lights and turn signals on the subject vehicle, and the subject vehicle's movement and location relative to other vehicles (e.g. distance to collision measurements between the subject vehicle and a vehicle).

In certain examples, driving behavior data may also comprise traffic-related characteristics which can be used to identify a subject vehicle (e.g., vehicle type, vehicle color, etc.). Accordingly, the ECU may use these identifying characteristics to construct a pseudo identification for the subject vehicle.

Here, a pseudo identification may refer to an artificial identification for the subject vehicle. In certain examples, the pseudo identification may comprise one or more hash values corresponding to at least one of the following: (1) vehicle type; (2) vehicle color; and (3) location of the subject vehicle within a road section. As will be described below, when the ECU transfers collected/processed driving behavior data associated with the subject vehicle to other detecting entities, the ECU may also transfer the pseudo identification for the subject vehicle. Accordingly, other detecting entities may utilize the pseudo identification to quickly identify the subject vehicle within a road section. Thus, one or more of these other detecting entities may commence their own unsafe driving analysis expediently, resulting in earlier unsafe driving detection. As described above, early unsafe driving detection may improve traffic safety.

The ECU may collect the driving behavior data associated with the subject vehicle in any number of ways. In certain examples, the ECU may collect the driving behavior data from image and proximity sensors (e.g., cameras, radar, lidar, sonar, etc.) equipped on the detecting vehicle. In other examples, the ECU of the detecting vehicle may collect the driving behavior data from other vehicles or smart infrastructure.

At operation 504, the ECU may process the collected driving behavior data to determine whether the subject vehicle is driving unsafely. Here, processing the collected driving behavior data may comprise (1) detecting unsafe driving behavior by the subject vehicle based on the collected driving behavior data; and (2) determining whether the detected unsafe driving behavior satisfies a threshold factor for unsafe driving behavior that indicates the subject vehicle is driving unsafely.

As described above, the ECU may utilize algorithms which detect unsafe driving behaviors (e.g., tailgating, swerving, nudging, etc.) based on raw driving behavior data. As a first example, the ECU may use an algorithm which detects swerving behavior based on collected lane offset measurements. As second example, the ECU may use an algorithm which detects nudging/aggressive merging behavior based on collected lane offset measurements. As a third example, the ECU may use an algorithm which detects tailgating behavior based on distance to collision measurements and vehicle speeds.

Once the ECU has detected some unsafe driving behavior by the subject vehicle, it can determine whether the detected unsafe driving behavior satisfies a threshold factor for unsafe driving behavior that indicates the subject vehicle is driving unsafely (as described above, by requiring satisfaction of a threshold factor for detected unsafe driving behavior, examples may reduce the occurrence of misclassifications).

Here, a threshold factor for unsafe driving behavior may comprise a combination of detected driving behaviors, or one or more values associated with one or more driving behaviors. For example, as described in conjunction with FIG. 4, one threshold factor for unsafe driving behavior may comprise two or more unsafe/aggressive driving behaviors (e.g. nudging behavior and tailgating behavior). A second example of a threshold factor for unsafe driving behavior may comprise a range of distance to collision measurements within a particular time window which indicates that a subject vehicle is tailgating unsafely. A third example of a threshold factor for unsafe driving behavior may comprise three consecutive swerves within 30 seconds.

In certain examples, a threshold factor for unsafe driving behavior may be pre-determined. In other examples the ECU may learn to set the threshold factor for unsafe driving behavior by observing driving behavior over time.

As described above, in certain scenarios, the ECU may (1) detect unsafe driving behavior by the subject vehicle; and (2) determine that the detected unsafe driving behavior does not satisfy a threshold factor for unsafe driving behavior that indicates the subject vehicle is driving unsafely. In other words, the ECU may have a partial unsafe driving analysis which requires further observation/analysis to determine that the subject vehicle is driving unsafely. In certain examples, it is this type of partial unsafe driving analysis which will be transferred at operation 506.

Accordingly, at operation 506, in response to an event which interrupts the ECU from collecting additional driving behavior data associated with the subject vehicle, the ECU may transfer at least one of the collected driving behavior data and the processed driving behavior data to a second detecting entity.

Here, the event which interrupts the ECU from collecting additional driving behavior data associated with the subject vehicle may take various forms. For example, the detecting vehicle's sensors may become partially occluded (e.g., the sun, or dirt/mud may occlude the detecting vehicle's camera) or noise may arise in the detecting vehicle's sensor system.

In certain examples, the event which interrupts the ECU from collecting additional driving behavior data associated with the subject vehicle may comprise a change in positional relationship between the detecting vehicle and the subject vehicle. This change in positional relationship may result from various traffic-related situations. In some examples, a traffic-related situation may cause the detecting vehicle's view of the subject vehicle to become obstructed—thus impeding the detecting vehicle's image and proximity sensors from collecting reliable driving behavior data associated with the subject vehicle. For example, as illustrated in FIG. 3, a third vehicle may merge in between the detecting vehicle and the subject vehicle. In other examples, a traffic-related situation may cause the subject vehicle to exit an observable range for the detecting vehicle (here, the observable range of the detecting vehicle may be the range of distances between the detecting vehicle and the subject vehicle where the detecting vehicle can collect reliable driving behavior data). For example, the subject vehicle may suddenly change lanes, speed up or slow down, or turn onto another roadway, thus leaving the detecting vehicle's observable range.

In some examples, the ECU may anticipate the change in positional relationship between the detecting vehicle and the subject vehicle before it arises. For example, if the subject vehicle is trailing the detecting vehicle on a section of highway, the ECU may detect that a third vehicle intends to merge in between the detecting vehicle and the subject vehicle. For example, the ECU may detect the operation of a turn signal on the third vehicle, and/or detect that the third vehicle is beginning to ease into the lane in front of the subject vehicle. Here, the ECU may collect this information from image and proximity sensors of the detecting vehicle, or in certain examples, from V2X communication with the third vehicle. Where the ECU anticipates a change in positional relationship between the detecting vehicle and the subject vehicle before it arises, the ECU may notify the second detecting entity that it intends to transfer unsafe driving analysis to the second detecting entity, before the collected/processed driving behavior data is actually transferred. This advance notification may operate as a "handshake" which allows the second detecting entity to identify the subject vehicle more quickly, and commence its own unsafe driving analysis on the subject vehicle.

The second detecting entity may be other another vehicle on the roadway, smart infrastructure, or even the cloud. As described in conjunction with FIG. 2, the ECU may communicate with the second detecting entity using various wireless communication protocols such as WiFi, Bluetooth, near field communications (NFC), Zigbee, etc.

In certain examples, before transferring the collected/processed driving behavior data, the ECU may determine that the second detecting entity is in observable range of the subject vehicle. For example, the ECU may use image and proximity sensors of the first detecting vehicle to determine that the second detecting entity is within a threshold proximity of the subject vehicle.

In some examples, the ECU may leverage predictions about where the second detecting entity and subject vehicle will be located at a future time, to determine that the second detecting entity will be in observable range of the subject vehicle at the future time. For example, in the example scenario of FIG. 3, the ECU (located in detecting vehicle 305) may predict that vehicle 309 (i.e., the second detecting entity) will merge in between detecting vehicle 305 and subject vehicle 307 based on e.g., the operation of a turn signal on vehicle 309, lane offset measurements for vehicle 309, etc. Accordingly, the ECU may predict that vehicle 309 will be in observable range of subject vehicle 307 once it merges. In anticipation of the predicted merge by vehicle 309, the ECU may transfer the driving behavior data associated with subject vehicle 307 that it has collected/processed to the vehicle 309.

In various examples, the ECU may determine that multiple detecting entities (including the second detecting entity) are in observable range of the subject vehicle. Accordingly, the ECU may transfer collected/processed driving behavior data associated with the subject vehicle to the multiple detecting entities within observable range of the subject vehicle.

The ECU may transfer raw driving behavior data that it has collected (e.g., lane offset measurements, distance to collision measurements, vehicle speeds, etc.), processed driving behavior data (e.g., detected swerving behavior, detecting nudging behavior, detecting tailgating behavior), or a combination of collected (raw) driving behavior data and processed driving behavior data—to the second detecting entity. As described above, by transferring the driving behavior data associated with the subject vehicle that it has collected/processed, the ECU ensures that the second detecting entity is able determine that the subject vehicle is driving unsafely, as quickly as possible. In other words, by transferring its driving behavior analysis, the ECU ensures that the second detecting entity gets a jump start on its own unsafe driving analyses. Here, early unsafe driving detection may improve traffic safety.

As described above, in certain examples the ECU may also transfer a pseudo identification for the subject vehicle to the second detecting entity. The pseudo identification may comprise one or more hash values corresponding to at least one of the following: (1) vehicle type; (2) vehicle color; and (3) location of the subject vehicle within a road section. The second detecting entity may utilize the pseudo identification to quickly identify the subject vehicle within a road section. Thus, the second detecting entity may commence its own unsafe driving analysis expediently, resulting in earlier unsafe driving detection. As described above, early unsafe driving detection may improve traffic safety.

Figure 6:
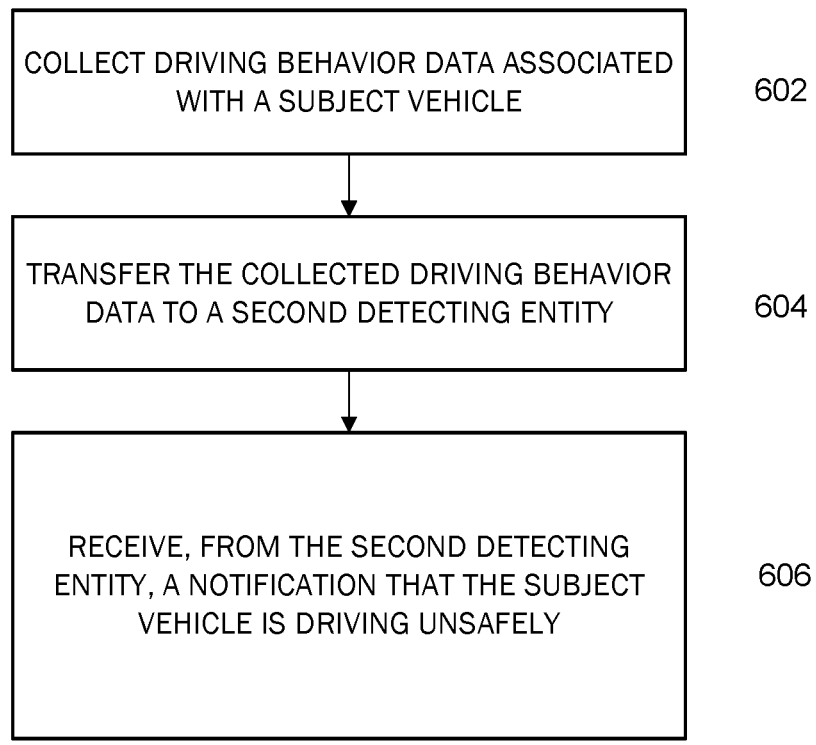
FIG. 6 is another flowchart illustrating example operations that can be performed by an ECU in a detecting vehicle to transfer unsafe driving data/analysis to another detecting entity.

FIG. 6 is another flowchart illustrating example operations that can be performed by an ECU in a first detecting vehicle to transfer unsafe driving data/analysis to a second detecting entity.

At operation 602, the ECU may collect driving behavior data associated with a subject vehicle. This operation may be performed in the same/similar manner as described in conjunction with operation 502 of FIG. 5.

In various examples, the ECU may also process the collected driving behavior data to determine whether the subject vehicle is driving unsafely. This may be done in the same/similar manner as described in conjunction with operation 504 of FIG. 5.

At operation 604, the ECU may transfer the collected driving behavior data associated with the subject vehicle to the second detecting entity. Here, the second detecting entity may be another vehicle on the roadway, smart infrastructure, or even the cloud. The ECU may transfer the collected driving behavior data to the second detecting entity in the same/similar manner as described in conjunction with FIG. 5. In examples where the ECU processes the driving behavior data it collects, the ECU may also transfer this processed driving behavior data to the second detecting entity.

As described in conjunction with FIG. 5, in certain examples the ECU may transfer its collected/processed driving behavior data to the second detecting entity in response to an event which interrupts the ECU from collecting additional driving behavior data associated with the subject vehicle.

However, in other examples such an event may not be required to transfer collected/processed driving behavior data to the second detecting entity. Instead, the ECU may transfer its collected/processed driving behavior data for other reasons. For example, the ECU may lack requisite computing resources or driving behavior knowledge to determine whether the subject vehicle is driving unsafely. In other situations, the ECU may be impeded from collecting certain types of driving behavior data associated with the subject vehicle based on its existing positional relationship with the subject vehicle.

For example, the first detecting vehicle may be located directly behind the subject vehicle. Accordingly, the first detecting vehicle may be in a good position to collect lane offset measurements for the subject vehicle, but not in a good position to measure the distance to collision between the subject vehicle and the second detecting entity located directly in front of the subject vehicle. In other words, the first detecting vehicle may be in a good position to detect whether the subject vehicle is swerving or nudging, but not in a good position to detect whether the subject vehicle is tailgating behind the second detecting entity. However, the second detecting entity may be in a good position to measure distances to collision for the subject vehicle and detect whether the subject vehicle is tailgating. Utilizing its imaging and proximity sensors, the first detecting vehicle may determine that second detecting entity is in a better position to detect distances to collision measurements/tailgating behavior for the subject vehicle. Accordingly, the first detecting vehicle may transfer the lane offset measurements it has collected/processed for the subject vehicle to the second detecting entity. As described above, the second detecting entity may utilize this collected/processed driving behavior data to jump start its own unsafe driving detection analysis.

For example, the second detecting entity may use the lane offset measurements received from the first detecting vehicle (along with any lane offset measurements the second detecting entity has collected) to detect that the subject vehicle is swerving or nudging. The second detecting entity may also use collected distance to collision measurements to detect that the subject vehicle is tailgating. Accordingly, based on detected swerving/nudging and tailgating, the second detecting entity may determine that the subject vehicle is driving unsafely.

At operation 606, the ECU may receive, from the second detecting entity, a notification that the subject vehicle is driving unsafely. Here, the ECU may receive the notification from the second detecting entity via various wireless communication protocols such as WiFi, Bluetooth, near field communications (NFC), Zigbee, etc.

As described above, the second detecting entity may make the determination that the subject vehicle is driving unsafely based on a combination of (1) collected/processed driving behavior data associated with the subject vehicle received from the ECU of the first detecting vehicle; and (2) collected/processed driving behavior data associated with the subject vehicle collected by the second detecting vehicle. In various examples, the second detecting entity may be better suited to make this determination than the ECU of the first detecting vehicle (e.g., because the second detecting vehicle has superior unsafe driving detection technology, the second detecting entity can collect certain types of driving behavior data that the ECU cannot, etc.). In other words, through collaboration with the second detecting entity, the ECU may gain an earlier awareness that subject vehicle is driving unsafely than would be the case if the ECU had not shared the driving behavior data it had collected/processed with the second detecting entity.

Figure 7:
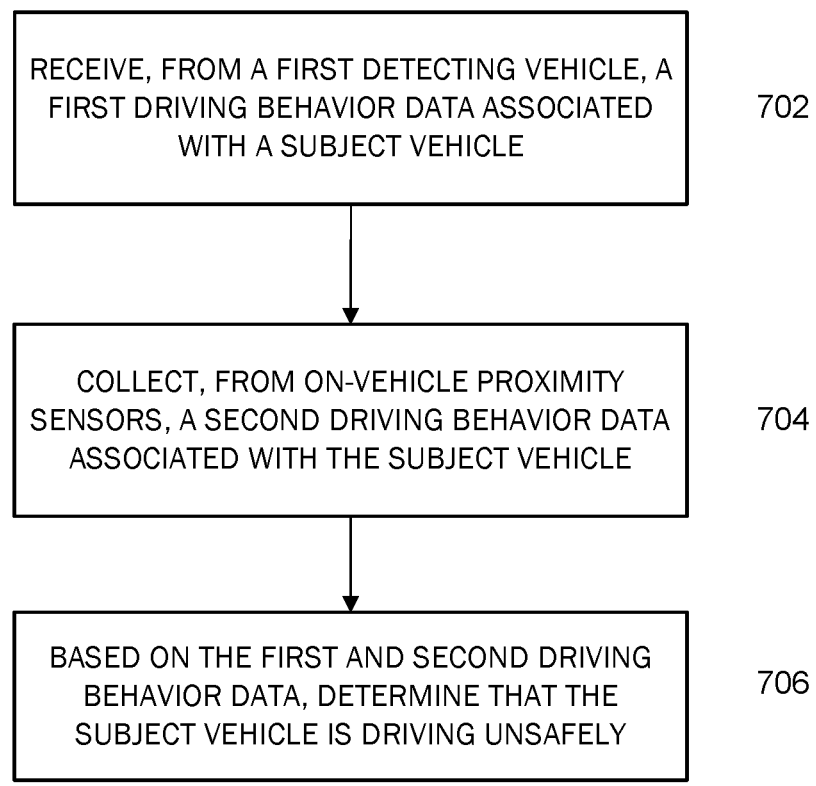
FIG. 7 is a flowchart illustrating example operations that can be performed by an ECU in a detecting vehicle to leverage another detecting vehicle's unsafe driving analysis to determine that a subject vehicle is driving unsafely.

FIG. 7 is a flowchart illustrating example operations that can be performed by an ECU in a second detecting vehicle to leverage a first detecting vehicle's unsafe driving analysis to determine that a subject vehicle is driving unsafely.

At operation 702, the ECU may receive, from the first detecting vehicle, a first driving behavior data associated with the subject vehicle.

Here, the first detecting vehicle may be the same/similar as the detecting vehicles described in conjunction with the previous figures. For example, the first detecting vehicle may be the detecting vehicle described in conjunction with FIG. 5. As described above, the first detecting vehicle may collect and process driving behavior data associated with the subject vehicle. Then, in response to an event which interrupts the first detecting vehicle from collecting additional driving behavior data associated with the subject vehicle, the first detecting vehicle may transfer its collected/processed driving behavior data (i.e., the first driving behavior data) to the second detecting vehicle.

The first driving behavior data associated with the subject vehicle may comprise (a) raw driving behavior data (e.g., lane offset measurements, distance to collision measurements, vehicle speed measurements, etc.); (b) processed driving behavior data (e.g., detected swerving behavior, detecting nudging behavior, detecting tailgating behavior); or (c) or a combination of raw driving behavior data and processed driving behavior data. In certain examples, the first driving behavior data may have been collected/processed by the first detecting vehicle. In other examples, the first detecting vehicle may have received all (or a portion) of the first driving behavior data from another detecting entity (e.g., a third detecting vehicle, smart infrastructure, etc.).

In certain examples, the ECU may also receive, from the first detecting vehicle, a pseudo identification for the subject vehicle. As described above, the pseudo identification may comprise one or more hash values corresponding to at least one of the following: (1) vehicle type (for the subject vehicle); (2) vehicle color (for the subject vehicle); and (3) location of the subject vehicle within a road section. Accordingly, the ECU may utilize the received pseudo identification to identify the subject vehicle. As described above, by identifying the subject vehicle as quickly as possible, the ECU may reduce the amount of time required to determine that the subject vehicle is driving unsafely.

At operation 704, the ECU may collect, from one or more image and proximity sensors of the second detecting vehicle, a second driving behavior data associated with the subject vehicle. Here, the ECU may collect the second driving behavior data associated with the subject vehicle in the same/similar manner described in the previous FIGs. For example, the ECU may collect lane offset measurements for the subject vehicle from a rear facing camera of the second detecting vehicle.

In some examples, the ECU may process the collected second driving behavior data associated with the subject vehicle to determine whether the subject vehicle is driving unsafely. Here, the ECU may process the collected second driving behavior data in the same/similar manner as described in the previous FIGs. For example, utilizing the collected second driving behavior data, the ECU may (1) detect unsafe driving behavior by the subject vehicle; and (2) determine whether the detected unsafe driving behavior satisfies a threshold factor for unsafe driving behavior that indicates the subject vehicle is indeed driving unsafely.

At operation 706, based on the first and second driving behavior data, the ECU may determine that the subject vehicle is driving unsafely.

As described above, the first driving behavior data may comprise raw driving behavior data and processed driving behavior data associated with the subject vehicle. Similarly, the second driving behavior data may comprise (a) raw driving behavior data; (b) processed driving behavior data; or (c) a combination of raw driving behavior data and processed driving behavior data. Accordingly, the ECU may determine that the subject vehicle is driving unsafely based on this composite data.

Here, determining that the subject vehicle is driving unsafely may comprise detecting an amount of unsafe driving behavior which satisfies a threshold factor for unsafe driving behavior that indicates the subject vehicle is indeed driving unsafely.

For example, the first driving behavior data may comprise processed driving behavior data which detects two swerves by the subject vehicle in the span of eight seconds. Here, the threshold swerving factor which indicates that a subject vehicle is driving unsafely may be three swerves in 30 seconds. Accordingly, based on the first driving behavior data alone the ECU may not determine that the subject vehicle is driving unsafely. The second driving behavior data may comprise processed driving behavior data which detects two additional swerves by the subject vehicle in a span of five seconds. Similar to above, based on the second driving behavior data alone, the ECU may not determine that the subject vehicle is driving unsafely. However, by analyzing the first and second driving behavior data together, the ECU may recognize that the subject vehicle has actually swerved four times in the span of approximately 13 seconds. Based on this analysis, the ECU may determine that the subject vehicle is driving unsafely. Accordingly, the ECU may identify the subject vehicle as an unsafe driver and take remedial action (e.g., alert other drivers or pedestrians, contact the police, etc.) more quickly having utilized the first driving behavior data.

Figure 8:
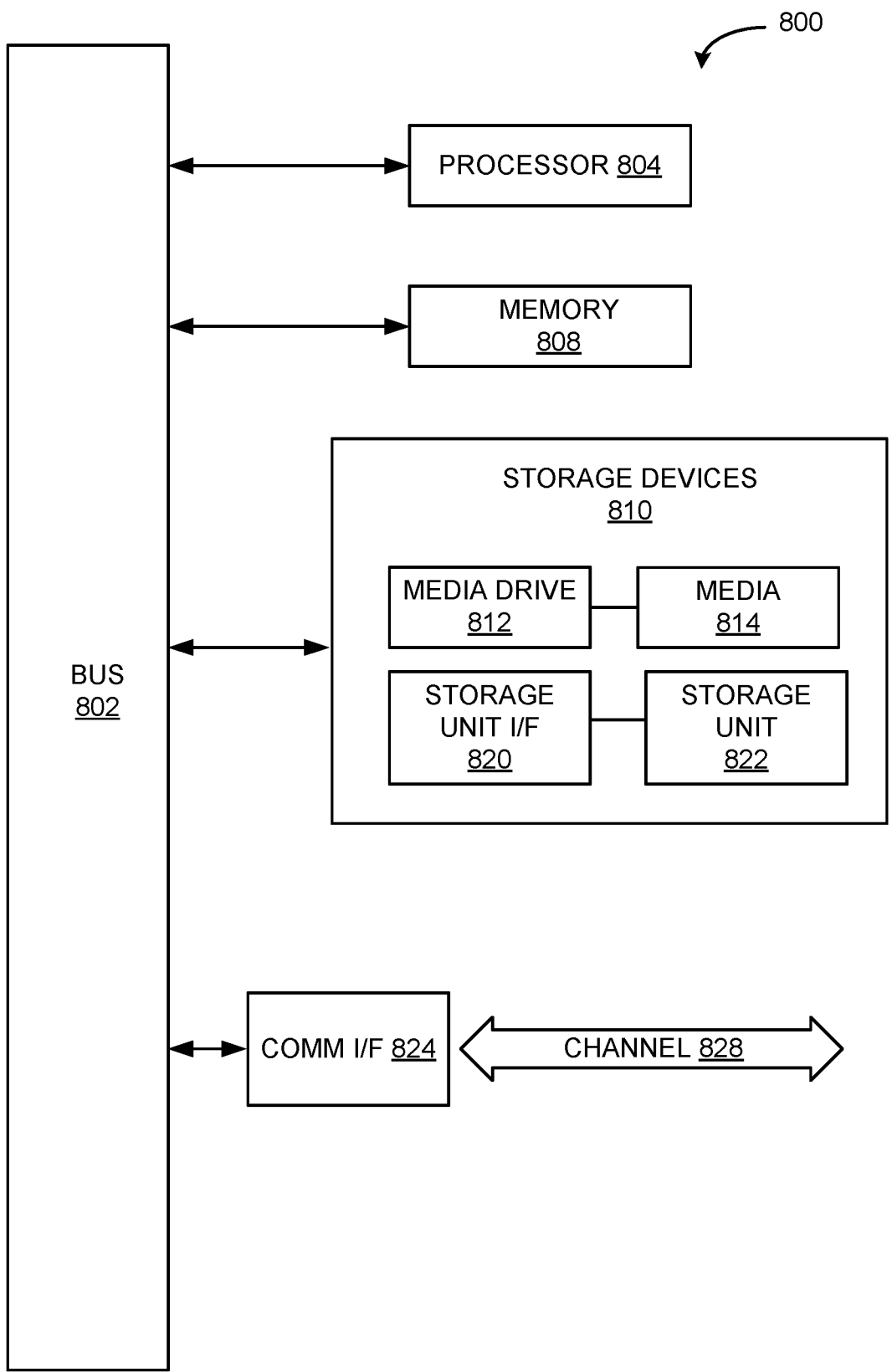
FIG. 8 is an example computing component that may be used to implement various features of examples described in the present disclosure.

As used herein, the terms circuit and component might describe a given unit of functionality that can be performed in accordance with one or more examples of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. Various examples are described in terms of this example—computing component 800. After reading this description, it will become apparent to a person skilled in the relevant art how to implement the application using other computing components or architectures.

Referring now to FIG. 8, computing component 800 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability.

Computing component 800 might include, for example, one or more processors, controllers, control components, or other processing devices. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 814 may be any other fixed or removable medium that is read by, written to or accessed by media drive 812. As these examples illustrate, the storage media 814 can include a computer usable storage medium having stored therein computer software or data.

In alternative examples, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

It should be understood that the various features, aspects and functionality described in one or more of the individual examples are not limited in their applicability to the particular example with which they are described. Instead, they can be applied, alone or in various combinations, to one or more other examples, whether or not such examples are described and whether or not such features are presented as being a part of a described example. Thus, the breadth and scope of the present application should not be limited by any of the above-described exemplary examples.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various examples set forth herein are described in terms of exemplary block diagrams, flow charts and other illustrations. As will become apparent to one of ordinary skill in the art after reading this document, the illustrated examples and their various alternatives can be implemented without confinement to the illustrated examples. For example, block diagrams and their accompanying description should not be construed as mandating a particular architecture or configuration.

What is claimed is:

1. A computer-implemented method comprising:
    collecting, by a first detecting vehicle, driving behavior data associated with a subject vehicle;
    processing, by the first detecting vehicle, the collected driving behavior data to determine whether the subject vehicle is driving unsafely; and
    in response to a second detecting vehicle merging in between the first detecting vehicle and the subject vehicle, transferring, by the first detecting vehicle, the processed driving behavior data to the second detecting vehicle.

2. The computer-implemented method of claim 1, wherein, processing the collected driving behavior data to determine whether the subject vehicle is driving unsafely comprises:
    detecting, by the first detecting vehicle, unsafe driving behavior by the subject vehicle based on the collected driving behavior data; and
    determining, by the first detecting vehicle, that the detected unsafe driving behavior does not satisfy a threshold factor for unsafe driving behavior that indicates the subject vehicle is driving unsafely.

3. The computer-implemented method of claim 2, wherein processing the collected driving behavior data to determine whether the subject vehicle is driving unsafely comprises:
    detecting, by the first detecting vehicle, swerving by the subject vehicle based on lane offset measurements; and
    determining, by the first detecting vehicle, that the detected swerving does not satisfy a threshold swerving factor that indicates the subject vehicle is driving unsafely.

4. The computer-implemented method of claim 1, wherein the collected driving behavior data comprises lane offset measurements for the subject vehicle.

5. The computer-implemented method of claim 1, wherein the driving behavior data is collected from one or more image and proximity sensors of the first detecting vehicle.

6. The computer-implemented method of claim 1, further comprising:
    constructing, by the first detecting vehicle, a pseudo-identification for the subject vehicle; and
    in response to the second detecting vehicle merging in between the first detecting vehicle and the subject vehicle, transferring, by the first detecting vehicle, the pseudo-identification to the second detecting vehicle.

7. The computer-implemented method of claim 6, wherein the pseudo-identification comprises one or more hash values corresponding to at least one of the following:
    vehicle type;
    vehicle color; or
    location of the subject vehicle within a road section.

8. The computer-implemented method of claim 1, further comprising:
    determining, by the first detecting vehicle, that the second detecting vehicle intends to merge in between the first detecting vehicle and the subject vehicle; and
    before the second detecting vehicle merges in between the first detecting vehicle and the subject vehicle, notifying, by the first detecting vehicle, the second detecting vehicle that the first detecting vehicle intends to transfer the processed driving behavior data to the second detecting vehicle.

9. A detecting vehicle comprising:
    one or more processers including machine executable instructions in non-transitory memory to cause the detecting vehicle to:
        collect driving behavior data associated with a subject vehicle;
        process the collected driving behavior data to determine whether the subject vehicle is driving unsafely; and
        in response to a second detecting vehicle merging in between the detecting vehicle and the subject vehicle, transfer the processed driving behavior data to the second detecting vehicle.

10. The detecting vehicle of claim 9, wherein the machine executable instructions include further instructions to:
    construct a pseudo-identification for the subject vehicle; and
    in response to the second detecting vehicle merging in between the detecting vehicle and the subject vehicle, transfer the pseudo-identification to the second detecting vehicle.

11. The detecting vehicle of claim 10, wherein the pseudo-identification comprises one or more hash values corresponding to at least one of the following:
    vehicle type;
    vehicle color; or
    location of the subject vehicle within a road section.

12. The detecting vehicle of claim 9, wherein the received driving behavior data comprises raw driving behavior data and processed driving behavior data.

13. The detecting vehicle of claim 12, wherein:
    the raw driving behavior data comprises lane offset measurements for the subject vehicle; and
    the processed driving behavior data comprises detected swerving by the subject vehicle.

14. The detecting vehicle of claim 13, wherein the instruction to determine that the subject vehicle is driving unsafely comprises an instruction to:
    based on the driving behavior data, detect an amount of swerving by the subject vehicle which satisfies a threshold swerving factor that indicates the subject vehicle is driving unsafely.

15. A computer-implemented method comprising:
    collecting, by a first detecting vehicle, driving behavior data associated with a subject vehicle;
    processing, by the first detecting vehicle, the collected driving behavior data to determine whether the subject vehicle is driving unsafely;
    determining, by the first detecting vehicle, that a second detecting vehicle intends to merge in between the first detecting vehicle and the subject vehicle;
    before the second detecting vehicle merges in between the first detecting vehicle and the subject vehicle, notifying, by the first detecting vehicle, the second detecting vehicle that the first detecting vehicle intends to transfer the processed driving behavior data to the second detecting vehicle; and
    in response to the second detecting vehicle merging in between the first detecting vehicle and the subject vehicle, transferring, by the first detecting vehicle, the processed driving behavior data to the second detecting vehicle.

16. The computer-implemented method of claim 15, further comprising:
- constructing, by the first detecting vehicle, a pseudo-identification for the subject vehicle; and
- transferring, by the first detecting vehicle, the pseudo-identification to the second detecting vehicle.

17. The computer-implemented method of claim 16, wherein the pseudo-identification comprises one or more hash values corresponding to at least one of the following:
- vehicle type;
- vehicle color; or
- location of the subject vehicle within a road section.

18. The computer-implemented method of claim 15, further comprising:
- determining, by the first detecting vehicle, that the subject vehicle is within observable range of the second detecting vehicle.

19. The computer-implemented method of claim 15, wherein the driving behavior data associated with the subject vehicle comprises lane offset measurements for the subject vehicle.

20. The computer-implemented method of claim 19, wherein processing the collected driving behavior data to determine whether the subject vehicle is driving unsafely comprises:
- detecting, by the first detecting vehicle, swerving by the subject vehicle based on the lane offset measurements; and
- determining, by the first detecting vehicle, that the detected swerving does not satisfy a threshold swerving factor that indicates the subject vehicle is driving unsafely.

* * * * *